United States Patent Office 3,641,146
Patented Feb. 8, 1972

3,641,146
HALOCOLCHICINE DERIVATIVES
Hans Lettre, Heidelberg, Germany, and Thomas J. Fitzgerald, Minneapolis, Minn., assignors to E. Merck AG, Darmstadt, Germany
No Drawing. Filed Feb. 24, 1969, Ser. No. 802,329
Claims priority, application Germany, Feb. 23, 1968, P 16 95 547.8
Int. Cl. C07c 103/38
U.S. Cl. 260—562 CL   11 Claims

ABSTRACT OF THE DISCLOSURE

Novel antimitotically effective halocolchicine compounds of the formula

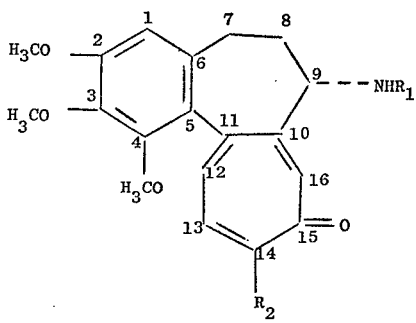

wherein
$R_1$ represents a mono-, di- or trihaloacyl residue of 2–4 carbon atoms;
$R_2$ represents

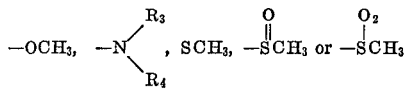

$R_3$ is $CH_3$ or $C_2H_5$; and
$R_4$ is H, $CH_3$ or $C_2H_5$.

BACKGROUND OF THE INVENTION

This invention relates to halocolchicine derivatives useful in the medical and biological arts.

Colchicine and colchicine derivatives have been employed chiefly as mitosis inhibitors in human therapy. Generally, the therapeutic effect of the compounds as cancerostatics is evaluated by animal experiments on mice. An important criterion in such experiments is the actual rate of survival.

SUMMARY OF THE INVENTION

An object of this invention is to provide novel halocolchicine derivatives, and particularly those which are antimitotically effective to the extent that extraordinarily high survival rates are observed in animal experiments.

Another object is to provide processes for synthesizing such novel compounds.

Other objects include methods of effecting therapeutic and biological activities based on the novel compounds of this invention.

Still further objects include the working up of the novel compounds into pharmaceutical and biological preparations.

Upon further study of the specification and claims, other objects and advantages of the present invention will become apparent.

To attain these objects, there are provided halocolchicine derivatives of Formula I:
wherein:

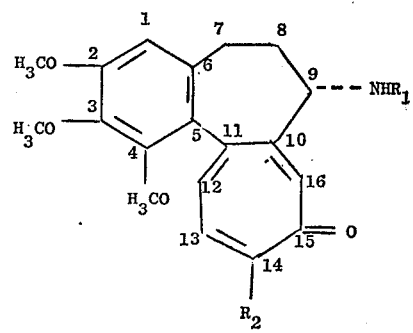

$R_1$ represents a mono-, di- or trihaloacyl residue of 2–4 carbon atoms;
$R_2$ represents

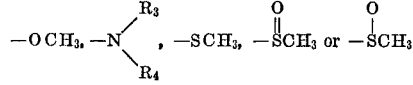

$R_3$ is $CH_3$ or $C_2H_5$; and
$R_4$ is H, $CH_3$ or $C_2H_5$.

These compounds are prepared by reacting a dehaloacyl-colchicine compound corresponding to Formula I (Formula I wherein, however, H is in place of $R_1$) with a mono-, di- or trihalocarboxylic acid of 2–4 carbon atoms, or with the reactive derivatives thereof, preferably with the corresponding acyl halides particularly acyl chlorides, or with acid anhydrides. Alternatively they can be synthesized by introducing one of the above-disclosed residues $R_2$, or the methyl residue present in the 2'-position, into a colchicine compound corresponding to Formula I which, however, does not yet contain the desired residues $R_2$ or the methyl residue in the 2'-position. Optionally, a corresponding isocolchicine compound can also be employed as the starting substance, which compound is isomerized, when a residue $R_2$ is introduced, in part, to the desired colchicine compound. It is also possible to exchange in the thus-produced colchicines of the above Formula I any halogen residue which may be undesirable in the substituent $R_2$ against another halogen residue, with the aid of a corresponding halogenide.

The novel halocolchicine derivatives of Formula I are incorporated in pharmaceutical preparations having an antimitotic or cytostatic, preferably cancerostatic, particularly antileukemic and/or anti-gout effect.

In addition, the compounds of Formula I effect polyploidy in plants. Accordingly, compounds of Formula I can be utilized as comparative controls and testing for antimitotic, cytostatic, mutagenic and/or polyploidic effects in the experimental biology.

DETAILED DISCUSSION OF THE INVENTION

Referring to Formula I, the residue $R_1$ represents mono-, di- or trihaloacyl of up to 4 carbon atoms, e.g. halogenated propionyl, such as β-chloro-propionyl or halogenated acetyl, such as chloroacetyl. Preferably, $R_1$ is a mono-, di- or trihaloacetyl residue, the latter being a trihaloalkanoyl radical.

The residue $R_2$ represents preferably $OCH_3$ or optionally also

wherein $R_3$ is, for example, methyl or ethyl, and $R_4$ preferably also represents methyl or ethyl. In this connection, the residues $R_3$ and $R_4$ can be identical or different.

Among the compounds of Formula I, particularly efficacious are the monochloro- or bromo- or -iodo-acetyl-compounds; the difluoro- or -chloracetyl-compounds; an especially favorable effect in animal experiments is exhibited by N-chloroacetyl-desacetyl-colchicine (Formula I, wherein $R_1 = -COCH_2Cl$, $R_2 = OCH_3$).

The compounds of the above Formula I can be prepared by reacting the corresponding dehaloacyl derivatives (Formula I, wherein $R_1$ is substituted by H) with a mono-, di- or trihalocarboxylic acid of 2–4 carbon atoms or a derivative of such an acid suitable for the acylation. Preferably, a mono-, di- or trihaloacetyl residue is introduced in accordance with this process.

It is possible, for example, to react a corresponding dehaloacyl-colchicine (Formula I, H in place of $R_1$) with a halocarboxylic acid of 2–4 carbon atoms, e.g. with a mono-, di- or trihaloacetic acid, such as chloroacetic acid, in the presence of dicyclohexyl carbodiimide. In this connection, the dicyclohexyl carbodiimide functions to split off water. The reaction is advantageously conducted in organic solvents, such as methylene chloride, acetonitrile, chloroform, dioxane, dimethyl formamide, or ethyl acetate. Very advantageous results are obtained when operating in polar solvents. Suitably, temperatures of about $-20°$ C. or higher are employed. The preferred temperature range is about $0°$ C. to room temperature, but temperatures up to about $100°$ C. can also be used.

Preferred functional acid derivatives for the reaction are acyl halides, particularly the acyl chlorides or acid anhydrides. The reaction is conducted in a conventional manner. For example, the acyl chloride or anhydride can be introduced into an optionally cooled solution of the dehaloacyl-colchicine derivative. (In this connection, the terms acid halide and acyl halide will be used interchangeably.)

When introducing the haloacyl residue, particularly a halogenated acetyl residue, by means of an acid halide, especially the acid chloride, an acid-neutralizing agent is preferably added, for example, an alkali or alkaline earth solution, such as sodium hydroxide, potassium hydroxide or barium hydroxide, or an alkaline salt, such as soda, or an inorganic base, such as pyridine or triethylamine. The reaction is conducted in an inert organic solvent, e.g. in a hydrocarbon, such as benzene, toluene or cyclohexane, or in a suitable ether, such as tetrahydrofuran or dioxane.

In order to introduce the haloacyl residue, especially a halogenated acetyl residue, by means of the anhydride, the reaction is likewise suitably conducted in an inert solvent. In general, the dehaloacylcolchicine compound is employed in an inert solvent, and the anhydride of a halogenated carboxylic acid, for example, a mono-, di- or trihaloacetic acid, particularly chloroacetic anhydride, is added. Generally, cooling of the reaction mixture is not necessary. If desired, the reaction mixture can be heated to an elevated temperature, e.g. 40–60° C., in order to effect complete conversion.

Other functional reactive carboxylic acid derivatives customarily employed for the acylation of an amine can be utilized for the reaction. Thus, a halocarboxylic acid ester, particularly a mono-, di- or trihaloacetic acid ester, can also be used for the reaction.

Respecting those starting materials where the residue $R_1$ set forth in Formula I is already present, but in the 14-position and/or 2'-position the desired substituents are missing, the colchicine derivatives of Formula I are prepared from these starting materials by introducing the missing substituents by conventional reactions.

For example, a colchicine compound of Formula I containing the desired residue $R_1$ in the 9'-position, but carrying an OH-group in the 14-position in place of $R_2$, can be converted into a compound of Formula I wherein $R_2 = OCH_3$ by reaction with a suitable methylating agent, preferably with diazomethane. The methylation is conducted in a solvent which does not contain mobile hydrogen. Suitable solvents are, for example, ether, dioxane, tetrahydrofuran, benzene or methylene chloride. In this connection, the diazomethane is employed in an excess, e.g. in a 0.5-molar excess or higher. Suitably, the methylation is conducted by allowing the mixture to stand at room temperature.

Furthermore, it is possible optionally to convert a 2'-desmethyl derivative of a colchicine compound according to Formula I wherein the $CH_3O-$ group in the 2-position is substituted by OH and $R_1$ and $R_2$ have the above-indicated meanings, into a desired 2-methoxy compound of the above Formula I by methylation in accordance with the customary methylation processes, particularly with diazomethane.

If a colchicine derivative according to the above Formula I but wherein the $CH_3O$ groups in the 2- and 14-positions are substituted by OH, is employed as the starting substance for the methylation, methyl groups can optionally be simultaneously introduced in the 2'- and 14'-positions.

Compounds of Formula I containing the residue

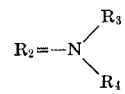

in the 14-position can be produced by the reaction of compounds of Formula I wherein $R_2$ represents $OCH_3$, or by the reaction of the corresponding 14-desmethyl compounds (above Formula I, but wherein an OH-group is in place of $R_2$) with a primary or secondary amine, respectively. This reaction can be conducted in the presence of a suitable solvent or also without solvents. For example, the starting compounds can be converted into the desired compound of Formula I containing the residue

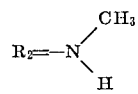

by reaction with an aqueous solution of monomethylamine at room temperature in the presence of methanol. The reaction is generally terminated after several hours. Suitably, starting substances according to Formula I are employed for this process wherein the residue $R_1$ does not contain any readily mobile halogen. For instance, corresponding starting compounds containing a residue $R_1 =$ mono-, di- or trifluoroacyl are suitable for introducing a residue $NR_3R_4$ in the 14-position.

Colchicine derivatives of Formula I where the substituent $R_2$ is $SCH_3$ can be prepared from the compounds corresponding to the above-mentioned Formula I wherein $R_2$ represents $OCH_3$ or is substituted by OH, by reacting same with methyl mercaptan. The process can be conducted in the presence of an acidic catalyst, preferably in the presence of p-toluenesulfonic acid, benzenesulfonic acid or boron trifluoride, in a solvent or even without any solvent. Suitable solvents are, for example, chlorinated hydrocarbons such as chloroform, or cyclic ethers, such as tetrahydrofuran. Because of the ready volatility of methyl mercaptan, the reaction is suitably conducted in sealed pressure vessels. The reaction is generally terminated after several hours or can take up to several days.

The preferred temperature range for the reaction is approximately between 15 and 50° C.

Furthermore, it is possible to prepare a colchicine derivative of Formula I containing the substituent

by oxidizing a corresponding compound of Formula I wherein $R_2$ represents $SCH_3$. In this oxidation process, the conditions are employed which are customary for the conversion of sulfides into sulfoxides. For example, the oxidation can be conducted under the conditions disclosed in Gilman, Org. Chem., vol. I, 2nd edition, New York (1967), pp. 870/71. Suitable oxidizing agents are predominantly peroxides, e.g. a 30% aqueous hydrogen peroxide solution, or peracids, such as perphthalic acid or perbenzoic acid. Also suitable are solutions of hypochlorous acid. The reaction is preferably carried out at a temperature of about 0–50° C. and in the presence of a chlorinated hydrocarbon, such as chloroform.

The sulfones of Formula I

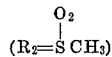

are obtained by oxidation of a compound I containing the substituent $R_2=SCH_3$ under rigorous conditions, e.g. with an excess of oxidizing agents, such as hydrogen peroxide and/or at elevated temperatures.

If ever desired, the halogen residues contained in the residue $R_1$ of the colchicine derivatives of Formula I can be exchanged for other halogen residues by reaction with suitable halogenides. Of particular importance is the substitution of chlorine or bromine or iodine, and the replacement of bromine by iodine. The exchange can be effected in accordance with the methods described in Houben-Weyl, "Methoden der Organischen Chemie" [Methods of Organic Chemistry], 4th edition, Georg Thieme Publishers, Stuttgart, vol. 5/3 (1962), pp. 119–210 and vol. 5/4 (1960), pp. 354–360 and pp. 595–605. It is also possible to exchange in the residue $R_1$ chlorine, bromine or iodine against fluorine, by reacting a compound of Formula I containing as the residue $R_1$ a chlorinated, brominated or iodated acetyl residue, with a suitable metallic fluoride, for example, silver fluoride. A compound of Formula I containing as the residue $R_1$ a brominated or chlorinated acetyl residue can also be converted into the corresponding compound I containing an iodated acetyl residue as the substituent $R_1$ by reaction with a suitable metallic iodide, particularly an alkali or alkaline earth iodide, such as sodium or potassium iodide. Furthermore, it is possible for example, to convert a compound I containing as $R_1$ a chlorinated acetyl residue, into the corresponding bromoacetyl compound by reaction with lithium bromide. Such exchange reactions are conducted in a suitable solvent, particularly in acetone.

In place of the above-mentioned various starting compounds for the preparation of the colchicine derivatives of Formula I, it is also optionally possible to employ the mixtures thereof with the corresponding isocolchicine compounds wherein the substituents sets forth above for the starting compounds are exchanged in the 14- and 15-positions. From such a mixture, in addition to a colchicine compound of Formula I, the corresponding isocolchicine compound is obtained which is then separated from the colchicine compound in a conventional manner, preferably by chromatography.

If a substituent is introduced into the 14-position, particularly the substituents $OCH_3$, $NR_3R_4$ or $SCH_3$, there is always obtained as the reaction product a mixture of the compounds I with the corresponding isocolchicines (Formula I, wherein $R_2$ and the keto group in the 15-position are exchanged); also in these cases, the isocolchicine compound is separated from the colchicine compound subsequently. In the embodiment of the process according to the invention wherein the desired substituent $R_2$ is introduced into a starting compound corresponding to Formula I but containing OH in place of $R_2$, the starting material can be the colchicine compound or also a corresponding isocolchicine compound of Formula II as follows:

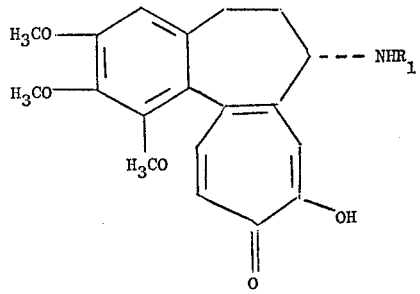

(II)

wherein $R_1$ has the above-indicated meanings; or a mixture of the colchicine and isocolchicine compound.

For example, for preparing a compound I wherein $R_2$ represents $OCH_3$, it is possible to employ a starting material corresponding to Formula I but wherein $R_2$ is replaced by OH and/or a corresponding isocolchicine compound of the above Formula II. Likewise, when introducing a methylthio residue in the 14-position it is possible to employ, besides a colchicine compound corresponding to Formula I but wherein $R_2=OCH_3$ or is replaced by OH, also the corresponding isocolchicine compound (above Formula II, wherein the OH-group in the 15-position can also be replaced by $OCH_3$). Furthermore, when introducing a residue $R_2=-NR_3R_4$ in the 14-position, it is possible to utilize, besides the starting compound according to Formula I wherein $R_2$ is replaced by OH, also a corresponding isocolchicine compound of the above Formula II.

If the thus-obtained colchicine compounds of the above Formula I are present in a mixture with the corresponding isocolchicine compounds, the desired colchicine compound I is separated from the mixture in a conventional manner. The separating step is advantageously conducted by chromatography with suitable elution agents, for example, chlorinated hydrocarbons, such as chloroform, carbon tetrachloride, methylene chloride, with the addition of a small amount of a low alcohol, such as methanol or ethanol, on a suitable adsorbent, such as silica gel. The thus-obtained compounds can be recrystallized for further purification, if necessary, from suitable solvents, such as, for example, methanol/ether.

The colchicine derivatives having the above-mentioned Formula I effective in therapy and/or in plant treatment are present in the l-form [levorotatory form]. It is therefore suitable to start, in the process of the present invention, likewise from corresponding colchicine and isocolchicine compounds which are present in the l-form. Of course, the starting compounds can also be present in the form of a racemate mixture, but in such a case it is advantageous to subsequently separate the effective l-form from the d-form which is still contained in the product of the process. The separation can be effected in a conventional manner, e.g. by treatment with optically active acids and separation of the salts, e.g. by chromatography.

STARTING MATERIALS

The starting compounds for the above-mentioned production processes are, in part, known from the literature attached herewith as appendix A, or are produced in accordance with conventional processes from known compounds.

For example, by treating N-desacetyl-14'-desmethyl-colchicine (obtainable by hydrolysis of colchicine) with diazomethane or methyl mercaptan in a conventional manner, it is possible to obtain starting substances according to Formula I which contain in the 14-position the substituents OCH$_3$ and/or —SCH$_3$, but wherein R$_1$ is substituted by H. Furthermore, the corresponding 14-amino-compounds (Formula I, R$_1$, substituted by H, R$_2$=NR$_3$R$_4$) can be obtained by the reaction of desacetyl colchicine with an amine HNR$_3$R$_4$. The starting compounds corresponding to Formula I, wherein R$_2$ is substituted by OH, or also the corresponding isocolchicines of the above-mentioned Formula II are obtainable, for example, by the acylation of N-desacetyl-14'-desmethyl-colchicine with the anhydride of a halogenated carboxylic acid, particularly the anhydride of a mono-, di- or trihaloacetic acid, for example, by treatment with chloroacetic anhydride. A 2'-desmethyl compound which is optionally employed as the starting substance can be produced, for instance, by hydrolyzing 2'-desmethyl-colchicine and subsequent acylation with the anhydride of a halogenated carboxylic acid, particularly the anhydride of a mono-, di- or trihaloacetic acid, and optional subsequent introduction of a residue R$_2$, as described above.

PHARMACOLOGY

The novel colchicine derivatives of the above Formula I possess a pronounced antimitotic and/or cytostatic effect. The compounds were tested by animal experiments, employing the method of H. Lettre, Hoppe Seyler's "Zeitschrift für Physiologische Chemie" [Periodical for Physiological Chemistry], 268, pp. 59–76 (1941), attached herewith as appendix B. In this test, the compounds of Formula I exhibited a higher efficacy than colchicine. For example, with N-chloroacetyldesacetyl-colchicine, a survival rate of above 60% with curing of the tumor was obtained at a daily dosage of respectively 5 micrograms, after five days of administration. In contrast thereto, by conducting an analogous treatment with colchicine at the identical dosage, no curative effect at all is obtained. Only when increasing the daily dosage to 10 micrograms, a healing of the tumor and a survival rate of merely 10% are attained with colchicine.

Of special advantage is the fact that, for example, N-chloro-acetyl-desacetyl-colchicine exhibits an inhibitory effect in the treatment of the "Ascites" tumor of the mouse, which tumor is resistant against colchicine. Furthermore, it is remarkable that the N-chloroacetyl-desacetyl-colchicine is about a hundred times more effective against the "Ascites" tumor of the mouse than 5-fluorouracil, which has been employed in animal experiments for tumor inhibition, based on identical amounts by weight of the employed active substance.

The novel compounds of the invention are to be utilized as cancerostatics, particularly for combating leukemia. Furthermore, it is planned to employ the compounds as therapeutics for healing gout. The novel colchicine derivatives can be employed in a mixture with conventional pharmaceutical excepients. Suitable carrier substances can be such organic compounds which are suitable for parenteral, enteral or topical application and which do not react with the novel compounds, such as, for example, water, vegetable oils, polyethylene glycols, gelatin, lactose, amylose, magnesium stearate, talc, vaseline, cholesterol. For parenteral application, particularly solutions are employed, preferably oily or aqueous solutions, as well as suspensions or emulsions. For enternal application, furthermore suitable are tablets or dragees, for topical application salves or creams which are optionally sterilized or mixed with auxiliary substances, such as preservatives, stabilizers or wetting agents, or salts for influencing the osmotic pressure, or with buffer substances. If desired, the colchicine derivatives of Formula I can also be combined with other therapeutically effective agents. The active agents are generally administered to mammals in a daily dosage range of between about 0.5 and 10 mg., a particularly preferred range being about 2–5 mg. The dosage per weight ratio is about 0.05 to 0.1 mg. per kg. of body weight, the dosage being increased or decreased according to the response of the mammal. Except as otherwise indicated herein, the compounds of Formula I are to be used in the same manner as colchicine.

In the experimental biology, the novel halocolchicine derivatives of the invention can be utilized especially as cancerostatic reagents and as comparison substances in the experimental cancer research, e.g. during chemotherapy experiments and research on the origin and metabolism of cancer. Furthermore, they can be employed in the diagnosis of hereditary diseases in connection with chromosome analysis. A further field of application is the virus research field, particularly in the study of the mechanism of virus propagation. Furthermore the compounds can be employed as mitosis poisons in experimental biology (microbiology, botany, zoology).

PLANT APPLICATION

The compounds of Formula I are suitable for use in polyploidy or in mitosis modification or for obtaining mutagenic changes in plants. Suitably, when employed in this connection, a compound I, optionally in a solution or on a carrier, is applied to the plant seeds, its root systems, axils or to the whole plant. A solution of the compounds I can also be injected into the blossom of the plants of infused into the stem of the plants. Another way is to saturate the cultivated grounds with the compounds of Formula I, preferably in an aqueous solution or suspension.

For plant polyploidy, the halocolchicine derivatives of this invention are employed preferably in the form of solutions in a concentration of about 0.01–0.2% using a conventional rate of application of for example 1 ml. per plant.

In general the compounds I are applied for the production and selection of especially favorable polyploid forms of practically all species of plants, in particular of species of cultivated plants and plants containing pharmacologically active compounds, in the manner usual for treating plants with antimitotic substances.

Of special significance is the increase in yield in cultivated plants obtained by effecting polyploidy, examples of such plants including, but not limited to bean (*Vicia faba*), sugar-beet (*Beta vulgaris* f. *altissima*), wheat (*Triticum aestivum*).

Carrier for the compounds I is preferably water, optionally together with an emulsifier and/or a buffer which holds the pH of the solution at an approximately neutral value, from about 6.0–7.5, as for example a phosphate buffer. Other carriers which may be used are agar or lanolin. If required, additional wetting agents or other additives usually applied in agents for plant treating, as for example glycerine, may be used.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

(A) EXAMPLES FOR THE PRODUCTION OF THE HALOCOLCHICINE DERIVATIVES OF THIS INVENTION

A solution of 0.88 g. of chloroacetyl chloride in 10 ml. of absolute benzene or methylene chloride is added to a mixture of 1.55 g. of desacetyl colchiceine in 40 ml. of absolute benzene or methylene chloride and 0.96 g. of sodium carbonate. The mixture is allowed to stand overnight at room temperature under agitation. Thereupon, the mixture is poured into 25 ml. of water, and the aqueous phase is acidified with hydrochloric acid. The organic phase is separated and thereafter shaken out with water, then with 5% sodium bicarbonate solution, and finally once more with water. After separating and drying over sodium sulfate, the organic phase yields, when concentrated by evaporation, a residue which latter is crystallized from methanol/ether, thus obtaining 0.805 g. of chlorocolchiceine (42% of theory); M.P. 204–206° C.

A solution of 1.21 g. of chlorocolchiceine in 50 ml. of methylene chloride is treated with an excess of diazomethane in methylene chloride. The solution is filtered as soon as no color is obtained any more with a $FeCl_3$ solution. Subsequently, the solvent is evaporated. The residue (1.28 g.) is dissolved in chloroform and introduced into a column filled with 30 g. of silica gel. The column is eluted with chloroform and 1% methanol in chloroform. The middle fractions are crystallized together with methanol/ether. Yield: 0.44 g. of chlorocolchicine (Formula I; $R_1 = -CO-CH_2Cl$; $R_2 = OCH_3$) corresponding to 32% of theory; M.P. 204–206° C.

Example 2

240 mg. of bromocolchicine is dissolved in 15 ml. of dried acetone, under reflux. Thereafter, the solution is mixed with 150 mg. of sodium iodide in 3 ml. of dried acetone. Thereupon, the reaction mixture is boiled for one-half hour, then filtered off, and the filtrate is concentrated by evaporation. The residue is distributed between 7 ml. of water and 7 ml. of chloroform. The organic phase is separated, then first washed with 3 ml. of 0.5% sodium thiosulfate solution and finally with 3 ml. of water. The solution, dried over sodium sulfate, results upon evaporation in a residue (280 mg.) which is recrystallized from absolute ethanol/ether.

Yield: 150 mg. of iodocolchicine (Formula I;

$R_1 = COCH_2I$ $R_2 = OCH_3$) corresponding to 57% of theory. The compound is sensitive to light and hydrolysis; M.P. 195° C.

Example 3

345 mg. of desacetyl colchicine is dissolved in 1 ml. of methylene chloride and mixed with 210 mg. of trifluoroacetic acid anhydride. The solution is first allowed to stand for 15 minutes at 0° C., and then another 1.5 hours at room temperature; thereafter, it is mixed with 5 ml. of water and 300 mg. of sodium bicarbonate. Then, the organic phase is shaken out with dilute hydrochloric acid and with water. The organic phase is then separated and dried over sodium sulfate, and evaporated. By recrystallization from acetone/hexane, the thus-formed desacetyl-N-trifluoroacetyl-colchicine precipitates in the form of needles having a melting point of 141–146° C.; by recrystallization from ethyl acetate, the desacetyl-N-trifluoroacetyl-colchicine is obtained in the form of prisms having the melting point of 196–198° C. Yield: 200 mg. (45% of theory).

By reacting desacetyl colchicine with trichloroacetic acid anhydride in an analogous manner, the desacetyl-N-trichloroacetyl-colchicine is produced.

Example 4

0.343 g. of desacetyl colchiceine and 0.105 g. of sodium carbonate in 30 ml. of methylene chloride are mixed with 0.190 g. of dichloroacetyl chloride in 5 ml. of methylene chloride. The mixture is stirred overnight at room temperature. Thereafter, the reaction mixture is poured into water, and the aqueous layer is acidified. Thereupon, the organic phase is separated from the aqueous phase, and then dried with sodium sulfate and concentrated. After treatment with active charcoal, the solvent is completely evaporated. The thus-obtained residue 200 mg.) is mixed with an excess of diazomethane in methylene chloride and allowed to stand overnight. Thereafter, the solvent is again evaporated, thus obtaining 200 mg. of residue which can be separated by thin-layer chromatography. For separating purposes, the residue is introduced into a column with 20 g. of silica gel and eluted with a mixture of chloroform/methanol in a ratio of 99:1. From the first fraction, 100 mg. of desacetyl-N-dichloroacetyl-colchicine is obtained, exhibiting, after recrystallization from methanol/ether, a melting point of 202–204° C.

Analogously, by the effect of difluoroacetyl chloride or dibromoacetyl chloride on desacetyl colchiceine in the presence of sodium carbonate and methylene chloride and subsequent methylation with diazomethane, it is possible to produce the desacetyl-N-difluoroacetyl-colchicine or the desacetyl-N-dibromoacetyl-colchicine, respectively.

EXAMPLE 5

1.06 g. of desacetyl colchiceine and 300 mg. of sodium carbonate in 50 ml. of methylene chloride are mixed with 380 mg. of β-chloropropionyl chloride in 10 ml. of methylene chloride. The mixture is allowed to stand overnight with agitation. Thereafter, the reaction mixture is poured into water, the aqueous phase is acidified, and the organic phase is separated and washed with water. After the solvent is evaporated, a residue of 1.23 g. is obtained which is dissolved in 100 ml. of methylene chloride and treated with diazomethane as set forth in Example 4. After the solvent is evaporated, a residue of 1.26 g. is obtained which is separated on a column analogously to Example 4. As the first fraction, 100 ml. of eluate are withdrawn, and as further fractions, 50 ml. portions of eluate, respectively.

Fractions 6 and 7 do not differ from each other with respect to the results of thin-layer chromatography. Fraction No. 6 is extracted with 40 ml. of diethyl ether. From this extract, an amorphous precipitate is obtained after allowing the extract to stand overnight; this precipitate can be made to crystallize by treatment with ethyl acetate/benzene. From Fraction No. 7, a crystalline precipitate is likewise obtained by evaporation and seeding with crystals from Fraction 6. From Fractions 6 and 7 is obtained, in total, 295 mg. of desacetyl-N-(β-chloropropionyl)-colchicine which, after recrystallization from ethyl acetate/ether, exhibits a melting point of 145° C.

Analogously, desacetyl colchiceine is reacted with γ-chlorobutyryl chloride in the presence of sodium carbonate and methylene chloride and then methylated with diazomethane. After the residue has been separated, there is obtained desacetyl-N-(γ-chlorobutyryl)colchicine.

Example 6

0.21 g. of desacetyl colchicine and 63 mg. of sodium carbonate are mixed, in 15 ml. of methylene chloride, with 57 mg. of fluoroacetic acid chloride. The mixture is agitated for 90 minutes under ice cooling and thereafter for another two hours at room temperature. Subsequently, the reaction mixture is poured into water. The thus-formed two phases are separated; the organic phase is washed twice with water. After drying with sodium sulfate and sodium carbonate, the organic solvent is distilled off, and there remains 0.11 g. of crude desacetyl-N-fluoroacetyl-colchicine which, after recrystallization from acetone/petroleum ether, is uniform with respect to thin-layer chromatography. The substance starts foaming at 120–125° C., the foam clearing up at 137–142° C. and being completely melted at 144° C.

Example 7

Analogously to Example 6, 0.343 g. of desacetyl colchiceine is reacted with 0.106 g. of sodium carbonate in 10 ml. methylene chloride with 0.158 g. of bromoacetyl chloride in 5 ml. of methylene chloride. The thus-obtained crude desacetyl-N-(bromoacetyl)-colchiceine (270 mg.) is recrystallized from ethanol/ether (M.P. 163–165.5° C.)

Example 8

3.48 g. of desacetyl-N-bromoacetyl-colchiceine is treated in 50 ml. of methylene chloride and 50 ml. of methanol with an excess of diazomethane in methylene chloride. A residue of 3.6 g. of reaction product is formed. The thus-obtained product is separated on a column filled with 90 g. of silica gel by elution with 200 ml. of chloroform and subsequently 235 ml. of chloroform/methanol in a ratio of 98:2. From the second fraction, 1.2 g. of desacetyl-N-bromoacetyl-colchicine is obtained which crystallizes, after recrystallization from ethanol/ether, in the form of needles having a melting point of 203–206° C.

Example 9

369 mg. (1 millimol) of amorphous desacetyl-colchicine is suspended in 20 ml. of water. Under agitation and at room temperature, 5.0 ml. of a 40% dimethylamine solution is added dropwise; during this procedure, the desacetyl-colchicine dissolves slowly and develops a strong intensification in color towards dark yellow. After 12 hours, water and excess dimethylamine are removed under vacuum, and the amorphous product is dried under a high vacuum.

200 mg. (0.54 millimol) of the thus-obtained amorphous N-desacetyl-14-desmethoxy-14-dimethylamino - colchicine is dissolved in 40 ml. of dichloromethane. A large excess (3 g.) of extremely finely powdered soda is added to the solution. The thus-obtained heterogeneous mixture is cooled, under stirring, to —10° C. After 55 mg. (0.57 millimol) of fluoroacetyl chloride in 20 ml. of absolute dichloromethane has been added dropwise, the reaction mixture is agitated for 12 hours, with gradual heating to room temperature. After once again cooling the reaction solution to —10° C., the small excess of fluoroacetyl chloride is destroyed by adding water dropwise, and the reaction mixture is vigorously agitated for another 2 hours. The organic phase is separated, the aqueous phase is once again extracted with 30 ml. of dichloromethane. The combined solutions are dried over sodium sulfate. After the solvent has been distilled under vacuum, a yellow, amorphous product remains.

A principal spot of $R_f$ 0.7 is obtained when conducting thin-layer chromatography on silica gel with the developer 20.5 ml. $CHCl_3$/1.5 ml. $CH_3OH$.

N-desacetyl-14-desmethoxy-N-fluoroacetyl-14-dimethylamino-colchicine is obtained in the pure form by column chromatography on 13 g. of $SiO_2$ in a column having a diameter of 0.9 cm. The eluate obtained with 100% chloroform (50 ml.) contains the desired compound. The eluates with 45 ml. $CHCl_3$/5 ml. ethyl acetate up to 20 ml. $CHCl_3$/30 ml. ethyl acetate likewise produce the main product which is contaminated somewhat by minor amounts of substances admixed therewith. The eluate obtained with 100% chloroform is evaporated under a vacuum. The residue is recrystallized from carbon tetrachloride to which 2% of n-hexane is added. The N-desacetyl-14-desmethoxy-N-fluoroacetyl-14-dimethylamino - colchicine is obtained in the form of yellow clusters of needles having a melting point of 145–146° C. for analysis purposes, the compound is dried for 8 days over $CaCl_2$/paraffin at 70° C. Subsequently, the compound is additionally recrystallized twice from ethyl acetate/n-hexane. The recrystallized product results in the correct elementary analysis.

$C_{23}H_{27}N_2O_5F$ 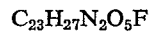
Molecular: 430.462
Melting point: 145–146° C.
$UV_{max}$ in ethanol: 256.5 m$\mu$ and 367.5 m$\mu$ Composition.—Calculated (percent): C, 64.11; H, 6.32; N, 6.51. Found (percent): C, 63.98; H, 6.22; N, 6.35.

Yield, based on desacetyl-cholchicine: 54% of theory.

EXAMPLE 10

Analogously to Example 9, N-desacetyl-14-desmethoxy-14-dimethylamino-colchicine is produced from desacetyl-cholchicine and dimethylamine.

300 mg. (0.81 millimol) of the amorphous N-desacetyl-14 - desmethoxy - 14 - dimethylamino-colchicine is dissolved in 40 ml. of absolute dichloromethane. Thereafter, 3.5 g. of solid, extremely finely pulverized soda is added. The mixture is cooled to —5° C. Under agitation, an excess of, in total, 112 mg. (1 millimol) of chloroacetyl chloride in 20 ml. of absolute dichloromethane is added dropwise to the cooled, heterogeneous mixture. The reaction mixture is stirred for about 18 hours under gradual heating to room temperature. After repeating the cooling step, the excess acid chloride is carefully destroyed with water. The aqueous dichloromethane solution is stirred for 2 hours. Thereafter, the organic phase is separated. The aqueous phase is extracted twice with 30 ml. portions, respectively, of dichloromethane; the dichloromethane extracts are combined, washed twice with 5 ml. of water, and dried over sodium sulfate. After removing the solvent under vacuum, an amorphous, yellow residue remains. The latter is chromatographed on 15 g. of silica gel in a column having a diameter of 1.1 cm. The eluate of 100% chloroform (200 ml. in total) is not as yet pure in this procedure (as can be determined by thin-layer chromatography). Consequently, the products is once again subjected to column chromatography on 5.0 g. of silica gel. The eluates of 35% n-hexane/65% $CHCl_3$ to 25% n-hexane/75% $CHCl_3$ are uniform and are combined. After distilling the solvent under a vacuum, the residue is recrystallized twice from $CCl_4$/n-hexane, thus obtaining the N-desacetyl - 14 - desmethoxy - N - chloroacetyl - 14 - dimethylamino-colchicine in the form of rhombi. The compound exhibits the following values:

$C_{23}H_{27}N_2O_5Cl$
Molecular weight: 446.919
Melting point: 195–196° C.
$UV_{max}$ in ethanol: 263 m$\mu$ Composition.—Calculated (percent): C, 61.81; H, 6.08; N, 6.26; Cl, 7.93. Found (percent): C, 61.69; H, 6.12; N, 6.20; Cl, 7.76.

Yield, based on desacetyl-colchicine: 62% of theory.

EXAMPLE 11

350 mg. (0.98 millimol) of desacetyl-colchicine is suspended in 30 ml. of water and converted into a solution with 10 ml. of ethanol. Under agitation, 5.0 ml. of 40% dimethylamine solution is added dropwise to the solution. The reaction mixture is stirred for another 9 hours, during which time the solution assumes a dark yellow color. After the solvent and the excess dimethylamine have been distilled, the residue is dried under a high vacuum and thereafter filtered on silica gel by column chromatography. The N-desacetyl - 14 - desmethoxy - 14 - dimethylamino-colchicine is obtained in the amorphous form, but relatively pure.

185 mg. (0.5 millimol) of amorphous N-desacetyl-14-desmethoxy-14-dimethylamino-colchicine is dissolved in 40 ml. of absolute dichloromethane. After adding 3.5 g. of solid pulverized soda, 1.45 g. (1/100 mol) of bromoacetyl chloride is added dropwise under agitation at —5° C. The reaction mixture is stirred for another 12 hours under gradual heating. After cooling once again, the excess acid chloride is decomposed with water and the reaction mixture worked up in the usual manner. The thin-layer chromatogram on silica gel shows, at an $R_f$ value of 0.6–0.7 (developer 17 ml. $CHCl_3$/3 ml. $CH_3OH$), a main spot in addition to further spots of lesser intensity. In order to obtain the compound in pure form, it is chromatographed on 10 g. of silica gel in a column having the diameter of 1.1 cm. For elution purposes, 25 ml. of solvent is employed in each case. The eluate from 20% $CCl_4$/80% $CHCl_3$ and 100% $CHCl_3$ results in the desired N-desacetyl-14-desmethoxy-N-bromoacetyl - 14 - dimethylamino-colchicine which is recrystallized from chloroform/n-hexane. The product is obtained in the amorphous form. Only by conducting a fractional recrystallization from the same solvent mixture several times is the compound obtained in the shape of clusters of needles. Although the compound appears pure with respect to thin-layer chromatography, and the thus-obtained CH values of the elementary analysis range within the customary margins of error (C calculated 56.22%, C found 56.05%; H, calculated 5.45%, H found 5.35%), it can be proven by mass spectroscopy that the bromine compound additionally contains small amounts of the corresponding chlorine compound. Melting point: 148–150° C.; yield: 69% of theory (based on desacetyl-n-colchicine).

Example 12

330 mg. (0.74 millimol) of N-desacetyl-14-desmethoxy - N - chloroacetyl-14-dimethylamino-colchicine produced as in Example 10) is heated under reflux in a large excess of, in total, 7.0 g. of well-dried sodium iodide in 40 ml. of absolute acetone for 24 hours. After cooling, the reaction mixture is filtered off from precipitated NaCl, and evaporated to dryness under a vacuum. The residue is taken up in 50 ml. of water. The colchicine derivative is extracted several times with 40 ml. portions, respectively, of dichloromethane, and is thus separated from the inorganic components. The combined dichloromethane extracts are washed twice with 10 ml. portions of water and dried over sodium sulfate. The solvent is then removed under vacuum. The thus-remaining residue is subjected to column chromatography on 17 g. of silica gel with respectively 50 ml. of solvent. The eluates from 100% $CHCl_3$ and from 80% $CHCl_3$/20% ethyl acetate contain the desired N-desacetyl-14-desmethoxy-N-iodoacetyl-14-dimethylamino-colchicine, which is recrystallized from ethyl acetate/n-hexane. The compound is examined by mass spectroscopy. The following values are obtained for the compound:

$C_{23}H_{27}N_2O_5I$
Molecular weight: 538.66
Melting point: 195–196° C.
$UV_{max}$ in ethanol: 216.25 m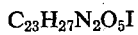 367.50 m$\mu$ Composition.—Calculated (percent): C, 51.31; H, 5.06; N, 5.20. Found (percent): C, 51.50; H, 5.21; N, 5.30.

Yield (based on desacetyl-n-colchicine): 38% of theory.

Example 13

345 mg. of desacetyl colchicine is dissolved in 1 ml. of methylene chloride and mixed with 184 mg. of chloroacetic acid anhydride. The solution is first allowed to stand for 15 minutes at 0° C. and then for another hour and a half at room temperature, and is then mixed with 5 ml. of water and 300 mg. of sodium bicarbonate. Then, the organic phase is shaken out with dilute hydrochloric acid and with water. The organic phase which is separated and dried over sidium sulfate is removed by evaporation. By recrystallization from methanol/ether, the thus-formed desacetyl - N - chloroacetyl - colchicine precipitates, M.P. 204–206° C.

Example 14

0.21 g. of desacetyl colchicine and 63 mg. of sodium carbonate are mixed in 15 ml. of methylene chloride with 67 mg. of chloroacetic acid chloride. The mixture is stirred for 90 minutes under ice cooling and thereafter for another two hours at room temperature. Then, the reaction mixture is poured into water. The thus-formed two phases are separated; the organic phase is washed twice with water. After drying with sodium sulfate and sodium carbonate, the organic solvent is distilled off. There remains crude desacetyl-N-chloroacetyl-colchicine which, after recrystallization from methanol/ether is uniform as determined by thin-layer chromatography. Melting point: 204–206° C.

(B) EXAMPLES OF PHARMACEUTICAL PREPARATIONS.—EXAMPLE I

Salve

Respectively 100 mg. portions of desacetyl-N-(bromo- (or iodo) acetyl)-colchicine are worked into a mixture of

| | Percent |
|---|---|
| Wool wax alcohol | 2 |
| Cetyl alcohol | 1 |
| Viscous paraffin oil | 15 |
| "Vaseline," white | 82 |

EXAMPLE II

Ampoules—Injection solution

Desacetyl - N - (chloroacetyl)-colchicine (2 mg.) is first dissolved in a small quantity of water, and then

| | Mg. |
|---|---|
| Potassium dihydrogen phosphate | 18.055 |
| Disodium hydrogen phosphate | 0.225 |
| Benzyl alcohol | 2 | are added, together with water, to obtain a volume of 2 ml.

EXAMPLE III

Tablets 5 mg. of desacetyl-N-(trifluoroacetyl)-colchicine is worked, together with 70 mg. of lactose, with the use of a methyl cellulose sludge, into a granulated mass and then processed with 10% of amylose and 10% of talc to obtain a weight of 100 mg./tablet, and thereafter pressed into tablets in a conventional manner.

(C) EXAMPLE OF SUBJECTING PLANTS TO POLYPLOIDY

Desacetyl-N-chloroacetyl-colchincine is dissolved in water in a concentration of 0.02%.

One milliliter of this solution is infused, one month before blossoming onset, into the stem of bean plants (*Vicia faba*) during the course of one day. The seeds are harvested after they have ripened and are employed for determining the degree of polyploidy, as well as for further cultivation in a conventional manner.

In another example, the seeds or axils of bean plants are treated with the above defined aqueous solution of desacetyl-N-chloroacetyl-colchicine for one day in a similar way. In the same manner sugar-beet (*Beta vulgaris* f. *altissima*) and wheat (*Triticum aestivum*) is treated with a solution of the desacetyl-N-chloroacetyl-colchicine.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compound of the formula

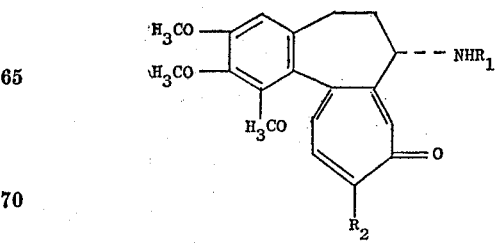

wherein
$R_1$ represents a mono-, di-, or trihaloalkanoyl residue of 2-4 carbon atoms, the halo moiety being selected from the group consisting of F, Cl, Br and I;

$R_2$ represents

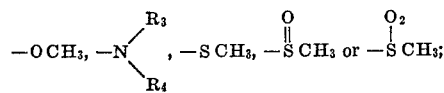

$R_3$ is $CH_3$ or $C_2H_5$; and
$R_4$ is H, CH or $CH_5$.

2. A compound as defined by claim 1 wherein R' represents $OCH_3$.

3. A compound as defined by claim 1 wherein $R_1$ represents a mono-, di- or trihaloacetyl residue.

4. A compound as defined by claim 2 wherein $R_1$ represents a mono-, di- or trihaloacetyl residue.

5. A compound as defined by claim 1 wherein $R_1$ is —$COCH_2Cl$ and $R_2$ is $OCH_3$.

6. A compound as defined by claim 1 wherein $R_1$ is —$COCH_2Br$ and $R_2$ is $OCH_3$.

7. A compound as defined by claim 1 wherein $R_1$ is —$COCH_2I$ and $R_2$ is $OCH_3$.

8. A compound as defined by claim 1 wherein $R_1$ is —$COCHCl_2$ and $R_2$ is $OCH_3$.

9. A compound is defined by claim 1 wherein $R_1$ is —$COCHF_2$ and $R_2$ is $OCH_3$.

10. A compound as defined by claim 1 wherein $R_1$ is —$COCF_3$ and $R_2$ is $OCH_3$.

11. A compound as defined by claim 1 wherein $R_1$ is —$COCH_2$—$CH_2Cl$ and $R_2$ is $OCH_3$.

References Cited

Raffaut et al., J. Am. Chem. Soc., vol. 75, pp. 5292–95 (1953).

HENRY R. JILES, Primary Examiner

H. I. MOATZ, Assistant Examiner

U.S. Cl. X.R

71—118; 424—324

UNITED STATES PATENT OFFICE
CERTIFICATE OF CORRECTION

Patent No. 3,641,146          Dated February 8, 1972

Inventor(s) Hans Lettre and Thomas J. Fitzgerald

It is certified that error appears in the above-identified patent and that said Letters Patent are hereby corrected as shown below:

In the Claims:

Claim 1, last line, change "CH or $CH_5$" to --$CH_3$ or $C_2H_5$--.

Claim 2, line 1, change "R'" to --$R_2$--.

Signed and sealed this 12th day of December 1972.

(SEAL)
Attest:

EDWARD M. FLETCHER, JR.          ROBERT GOTTSCHALK
Attesting Officer          Commissioner of Patents